United States Patent [19]

Kitada et al.

[11] Patent Number: 5,521,005
[45] Date of Patent: May 28, 1996

[54] MAGNETORESISTIVE HEAD

[75] Inventors: Masahiro Kitada, Hamura; Noboru Shimizu, Tokorozawa; Naoki Koyama, Kokubunji, all of Japan

[73] Assignee: Hitachi, Ltd., Tokyo, Japan

[21] Appl. No.: 981,400

[22] Filed: Nov. 25, 1992

[30] Foreign Application Priority Data

Nov. 25, 1991 [JP] Japan .................................. 3-308833
Dec. 25, 1991 [JP] Japan .................................. 3-342696

[51] Int. Cl.$^6$ .............................. B32B 5/16; G11B 5/66
[52] U.S. Cl. .................... 428/332; 428/336; 428/692; 428/684 T; 428/684 TS; 428/684 TM; 428/684 R; 428/900; 360/113
[58] Field of Search .......................... 428/900, 692, 428/694 T, 694 TS, 694 TM, 694 R, 332, 336; 360/113

[56] References Cited

U.S. PATENT DOCUMENTS

| | | | |
|---|---|---|---|
| 4,663,685 | 5/1987 | Tsang | 360/113 |
| 5,001,586 | 3/1991 | Aboaf et al. | 360/113 |
| 5,287,237 | 2/1994 | Kitada | 360/113 |

Primary Examiner—Leszek Kiliman
Attorney, Agent, or Firm—Antonelli, Terry, Stout & Kraus

[57] ABSTRACT

In a magnetic head whose recording and reproduction sections are separated, the magnetoresistive element constituting the reproduction head has a structure comprising a soft magnetic film, a spacer metallic film, and a magnetoresistive film and uses a high-performance soft magnetic film whose composition is Ni—Fe—Ru, Ni—Fe—Ru—M (M: fourth element), Ni—Fe—Ta or Ni—Fe—Ta—M (M: fourth element) and which has low coercivity, low magnetostriction, high specific resistance, high saturation magnetization, low magnetoresistivity and high corrosion resistance, this invention provides a recording-reproduction separation type magnetic head comprising a soft magntic bias film which is high magnetic performance, low production cost, and high corrosion resistance.

20 Claims, 10 Drawing Sheets

MAGNETORESISTIVE HEAD

BACKGROUND OF THE INVENTION

This invention relates to magnetoresistive heads used in magnetic recording units.

Magnetic heads using a magnetoresistive effect of ferromagnetic materials are required to use the linear part of a change of the magnetoresistive effect upon the magnetic fields. For this purpose, usually a shunt film, a soft magnetic film, and a permanent magnet film are placed adjacent to the magnetoresistive film as a means to apply a bias magnetic field. This invention relates to a soft magnetic film of a magnetoresistive element using a soft magnetic film, more particularly of a magnetoresistive element having a cross sectional structure comprising a crystallized soft magnetic film/a spacer metal film or a spacer insulator film/a magnetoresistive film. Coventional technologies pertaining to such a crystallized soft magnetic film are described in U.S. Pat. No. 4,663,685 and No. 5,001,586, Journal of Applied Physics, Vol. 69, No. 8, 1991, pp. 5631–5633, etc.

The soft magnetic films used as means to apply a bias magnetic field in a magnetoresistive element has various significant problems to be solved such as corrosion resistance, cost, dispersion of magnetic characteristics and aging reliability in addition to the magnetic characteristics. Although the conventional films made of NiFe—Rh alloy have excellent corrosion resistance and other characteristics, 20 to 25 at. % of expensive rhodium Rh must be added to NiFe, which increases its material cost. Contrarily, alloy films obtained by adding niobium Nb or zirconium Zr to NiFe are lower in cost than the NiFe—Rh alloy films, but their demerits are poor corrosion resistance, wide dispersion of magnetic characteristics, and great aging change. As for amorphous magnetic films, the initial layer deposited on the substrate is easily crystallized and the dispersion of magnetic characteristics and the change by heat treatment are very great.

SUMMARY OF THE INVENTION

It is an object of the present invention to solve problems of soft magnetic films such as corrosion resistance, cost, dispersion of magnetic characteristics, and aging reliability in addition to the magnetic characteristics.

To solve the said problems, the applicant examined the effects of the third and fourth elements to be added to the NiFe alloy films and added Ru or Ta as the third element and Ta, Nb, Ti, V, Zr, and Hf, or Nb, Ti, V, Zr, Hf, Ru, Rh, Ir, and Cr as the fourth elements.

Figure 1:
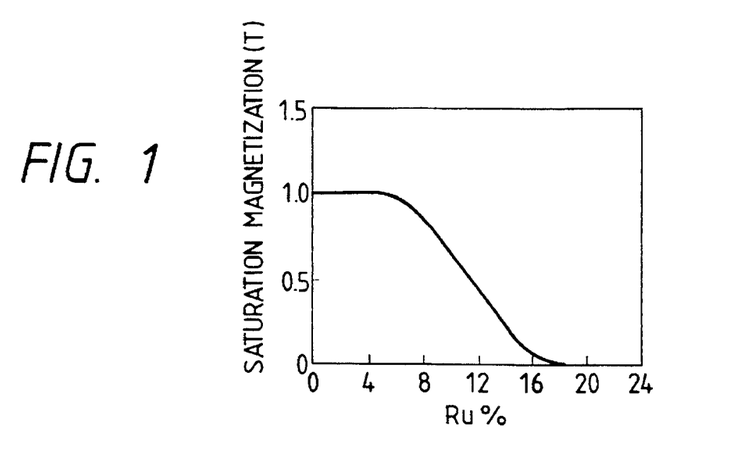
FIG. 1 is a graphic representation of the effect of one embodiment of the present invention.
Figure 2:
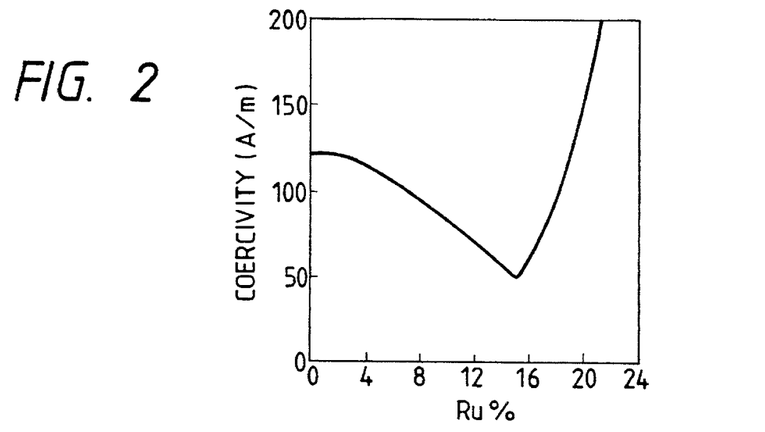
FIG. 2 is a graphic representation of the effect of one embodiment of the present invention.
Figure 3:
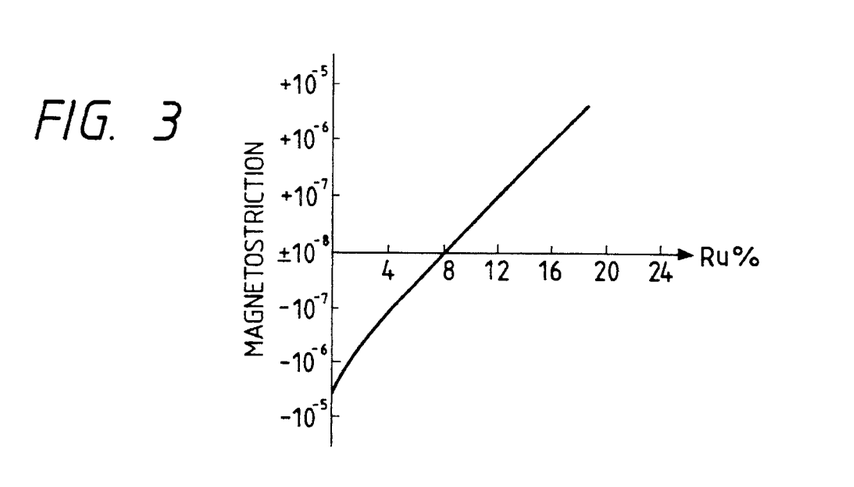
FIG. 3 is a graphic representation of the effect of one embodiment of the present invention.
Figure 4:
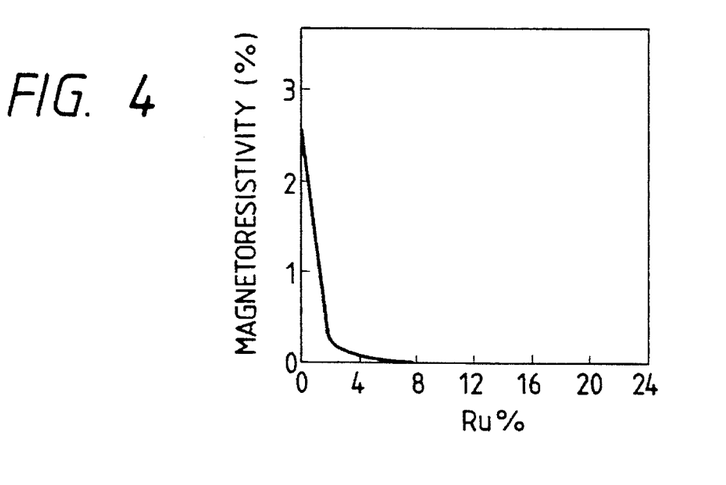
FIG. 4 is a graphic representation of the effect of one embodiment of the present invention.
Figure 5:
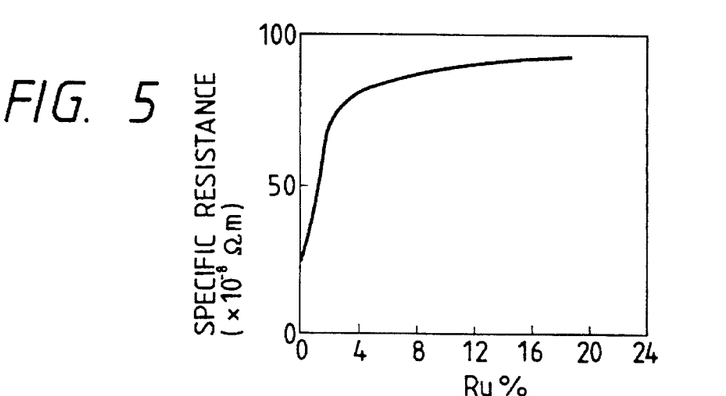
FIG. 5 is a graphic representation of the effect of one embodiment of the present invention.

One operation of the present invention is explained below using FIG. 1 to FIG. 5. In case Ru is added to NiFe alloy films, as shown in FIG. 1, no deterioration of saturation magnetization of the NiFe alloy film is found when ruthenium Ru of up to about 6 at. % is added. Saturation magnetization of the NiFe alloy film gradually goes down as the quantity of added ruthenium increases over 6 at. %. The coercivity, as shown in FIG. 2, gradually goes down as the quantity of added ruthenium increases up to 13 at. %, but goes up as the quantity exceeds 13 at. %. As shown in FIG. 3, the magnetostriction increases towards the positive area in the figure as the quantity of added ruthenium increases and the sign of the magnetostriction changes from negative to positive for the quantity of added ruthenium of about 8 at. % of in case the magnetostriction of the NiFe alloy film is $-3.5 \times 10^{-6}$ but the amount of the change is very little. As shown in FIG. 4, the magnetoresistivity of the soft magnetic film drastically goes down as the quantity of added ruthenium increases and falls under one tenth of that of the NiFe alloy film at about 2 at. % of ruthenium. As shown in FIG. 5, the specific resistance of the alloy film drastically increases as the quantity of added ruthenium increases up to 2 at. % but gradually increases after the quantity of ruthenium exceeds 2 at. % and reaches saturation (about 3 to 4 times the specific resistance of the NiFe alloy film). As explained above, the basic characteristics of the NiFe—Ru alloy films are very stable and the prepared alloy films have a very little dispersion of characterics in the range of 2 at. % to 13 at. % of quantities of added ruthenium Ru. Therefore, this composition area is available to bias films of magnetoresistive elements. Furthermore, as the result of corrosion resistance tests under conditions of high temperature and high humidity, the NiFe—Ru alloy films are superior to conventional alloy films. When small amounts of Ta, Nb, Ti, V, Zr, and Hf are added to such a NiFe—Ru alloy (as base alloy), the characteristics such as specific resistance of the obtained alloy become more preferable as those required for the biasing soft magnetic films without losing the above features of the NiFe—Ru alloy films.

To solve the said problems, the applicant examined the effects of the third and fourth elements to be added to the NiFe alloy films and added Ta as the third element and Nb, Ti, V, Zr, Hf, Ru, Rh, Ir, and Cr as the fourth elements.

Figure 6:
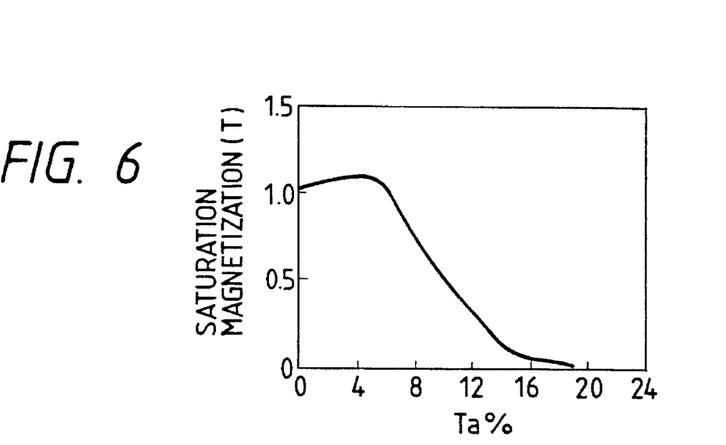
FIG. 6 is a representation of one embodiment of the present invention.

Another operation of the present invention is explained below using FIG. 6 to FIG. 10. In case Ta is added to NiFe alloy films, as shown in FIG. 6, no deterioration of saturation magnetization of the NiFe alloy film is found when tantalum Ta of up to about 6 at. % is added. Saturation magnetization of the NiFe alloy films gradually goes down as the quantity of added tantalum exceeds 6 at. %.

Figure 7:
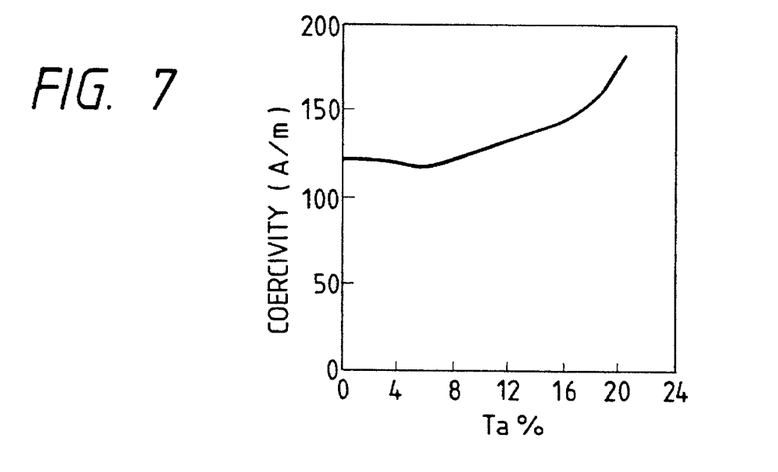
FIG. 7 is a representation of one embodiment of the present invention.

The coercivity, as shown in FIG. 7, remains almost unchanged when the quantity of added tantalum is up to 6 at. %, but goes up as the quantity exceeds 6 at. %.

Figure 8:
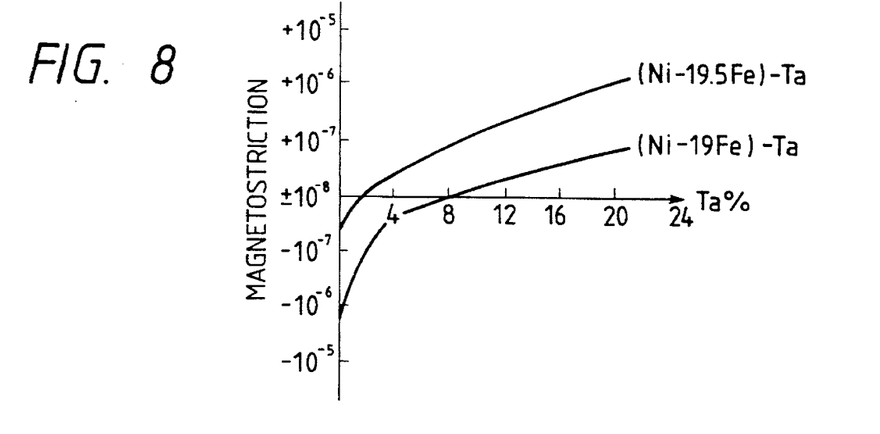
FIG. 8 is a representation of one embodiment of the present invention.

As shown in FIG. 8, the magnetostriction increases steeply towards the positive area in the figure as the quantity of added tantalum increases, but gradually increases when the quantity of added tantalum exceeds 2 at. %.

Figure 9:
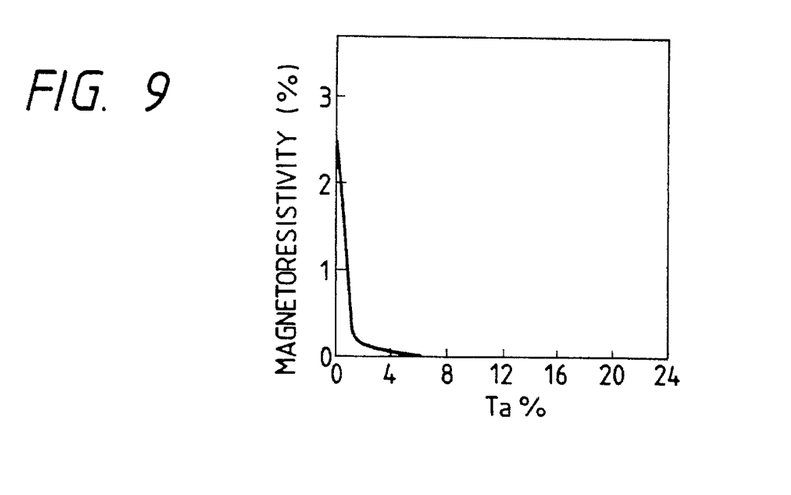
FIG. 9 is a representation of one embodiment of the present invention.

As shown in FIG. 9, the magnetoresistivity of the soft magnetic film drastically goes down as the quantity of added tantalum increases and falls under one tenth of that of the NiFe alloy film at about 2 at. % of tantalum.

Figure 10:
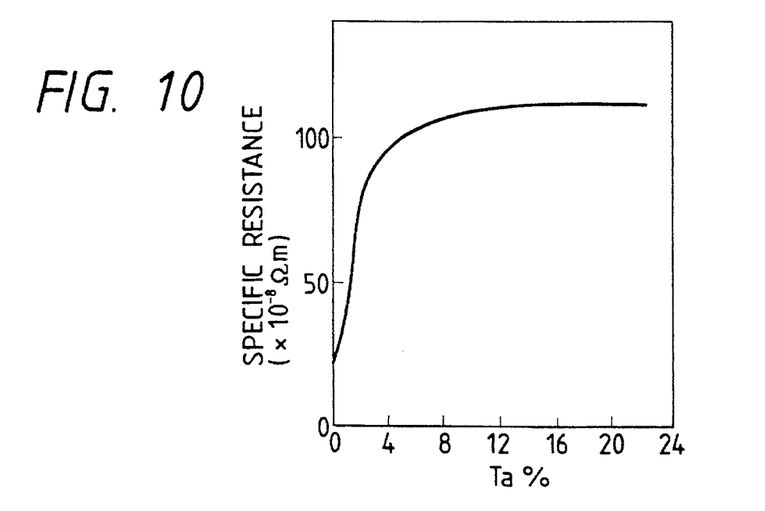
FIG. 10 Is a representation of one embodiment of the present invention.

As shown in FIG. 10, the specific resistance of the alloy film drastically increases as the quantity of added tantalum increases up to 2 at. % but gradually increases after the quantity of tantalum exceeds 2 at. % and reaches saturation (about 4 to 5 times the specific resistance of the NiFe alloy film). As explained above, the basic characteristics of the NiFe—Ta alloy films are very stable and the prepared alloy films have a very little dispersion of characterics in the range of 2 at. % to 9 at. % of quantities of added tantalum Ta. Therefore, this composition area is available to bias films of magnetoresistive elements. Furthermore, as the result of corrosion resistance tests under conditions of high temperature and high humidity, the NiFe—Ta alloy films are superior to conventional alloy films. Also the quantity of tantalum of 1 at. % to 12 at. % is available if the thickness of the film of the soft bias element.

When small amounts of Nb, Ti, V, Zr, Hf, Ru, and Rh are added to such a NiFe—Ta alloy (as base alloy), the characteristics such as specific resistance of the obtained alloy become more preferable as those required for the biasing soft magnetic films.

DETAILED DESCRIPTION OF THE PREFERRED EMBODIMENTS

[Embodiment 1]

A NiFe—Ru alloy target is prepared by attaching a 8 mm-diameter ruthenium disk(s) onto a Ni—Fe alloy plate containing iron Fe of 19 at. %. The amount of added ruthenium is adjusted by the number of ruthenium disks attached. This embodiment uses glass as the substrate. A NiFe—Ru alloy sputtered film is obtained by evacuating the vacuum tank of the sputtering device down to a vacuum of $10^{-4}$ Pa, supplying Ar gas into the vacuum tank to get a vacuum of $5 \times 10^{-1}$ Pa, and sputtering with a supply power of 200 watts. The obtained film is 5 nm to 100 nm thick. FIG. 1 represents the magnetic and magnetoresistive characteristics of the NiFe—Ru alloy sputtered film of 50 nm thick. As shown in FIG. 1, no deterioration of saturation magnetization of the NiFe alloy film is found when ruthenium Ru of up to about 6 at. % is added. However, saturation magnetization of the NiFe alloy film gradually goes down as the quantity of added ruthenium increases over 6 at. % and it goes under 0.4 when the quantity exceeds 13 at. %, which is less than the lower limit value (0.4T) available to the soft magnetic bias film. The coercivity, as shown in FIG. 2, gradually goes down as the quantity of added ruthenium increases up to 13 at. %, but goes up as the quantity exceeds 13 at. %. As shown in FIG. 3, the magnetostriction reduces gradually as the quantity of added ruthenium increases and the sign of the magnetostriction changes from negative to positive for the quantity of added ruthenium of about 8 at. % of in case the magnetostriction of the NiFe alloy film is $-3.5 \times 10^{-7}$, but the amount of the change is very little. The magnetostriction of under $\pm 10^{-6}$ is available to bias films. As shown in FIG. 4, the magnetoresistivity of the alloy film drastically goes down as the quantity of added ruthenium increases and falls under one tenth of that of the NiFe alloy film at about 2 at. % of ruthenium. As shown in FIG. 5, the specific resistance of the alloy film drastically increases as the quantity of added ruthenium increases up to 2 at. % but will be saturated for greater quantity of ruthenium (about 3 to 4 times that of the NiFe alloy films).

Figure 11:
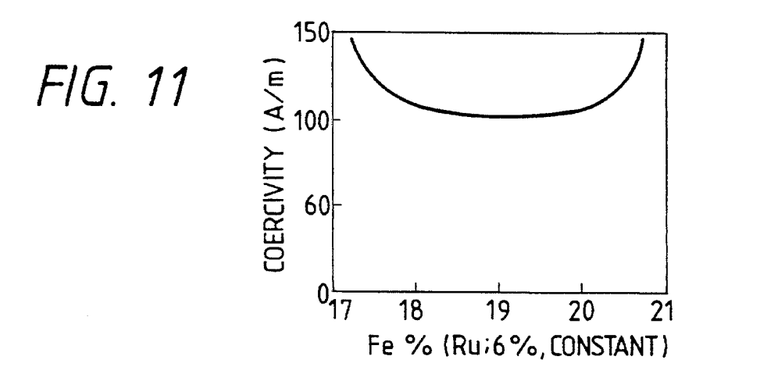
FIG. 11 is a graphic representation of the effect of one embodiment of the present invention.
Figure 12:
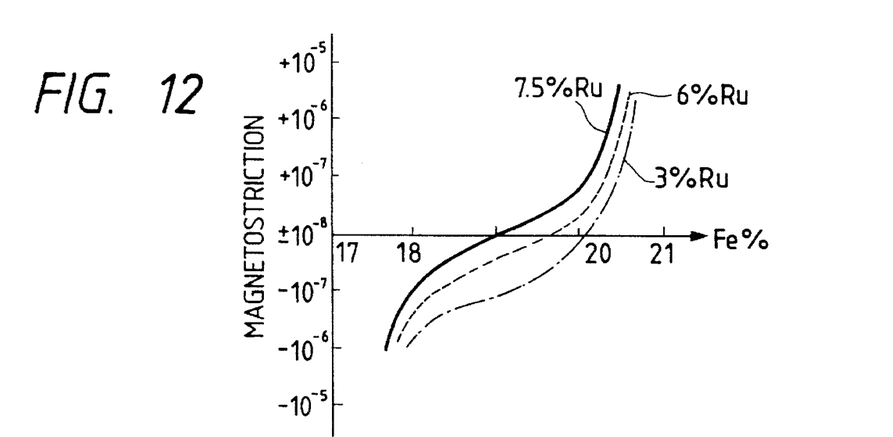
FIG. 12 is a graphic representation of the effect of one embodiment of the present invention.

As explained above, the basic characteristics of the NiFe—Ru alloy films are very stable and satisfactory. Judging from the above characteristics, the preferable quantity of ruthenium Ru to be added is 2 at. % to 13 at. %. This range of quantity of ruthenium gives excellent bias film characteristics and the obtained films have a very little dispersion of characerics. Then another NiFe—Ru alloy film having a different Ni—Fe composition is prepared to examine whether the characteristics of the NiFe—Ru alloy films are affected by Ni—Fe compositions. FIG. 11 shows a curve of representing the relationship between the coercivity (on the Y axis) and the Ni—Fe composition (on the X axis) (where the quantity of added ruthenium is constant). As seen from this figure, the coercivity is low and makes little change in the range of 79 at. % to 91 at. % of the ratio of Ni in the Ni—Fe alloy. Outside this range, the coercivity is high. Accordingly the preferable composition of the NiFe base alloy is in the range of 80:20 to 82:18 (Ni:Fe in at. %). FIG. 12 shows curves of representing how the relationship between the magnetostriction (on the Y axis) and the Ni—Fe composition (on the X axis) varies according to the quantity of added ruthenium. As seen from this figure, the magnetostriction like the coercivity is low (under $10^{-6}$) and makes little change in the range of 80 at. % to 82 at. % of the ratio of Ni in the Ni—Fe alloy. Outside this range, the magnetostriction is high. Therefore, also at the point of view of magnetostriction, the preferable composition of the NiFe base alloy is in the range of 80:20 to 82:18 (Ni:Fe in at. %).

The same result is obtained from a magnetoresistive head having the preset composition of the sputter target as the NiFe—Ru alloy.

[Embodiment 2]

A NiFe—Ru—Ta alloy target is prepared by attaching 8 mm-diameter ruthenium and tantalum disks onto a Ni-19 at.

Figure 13:
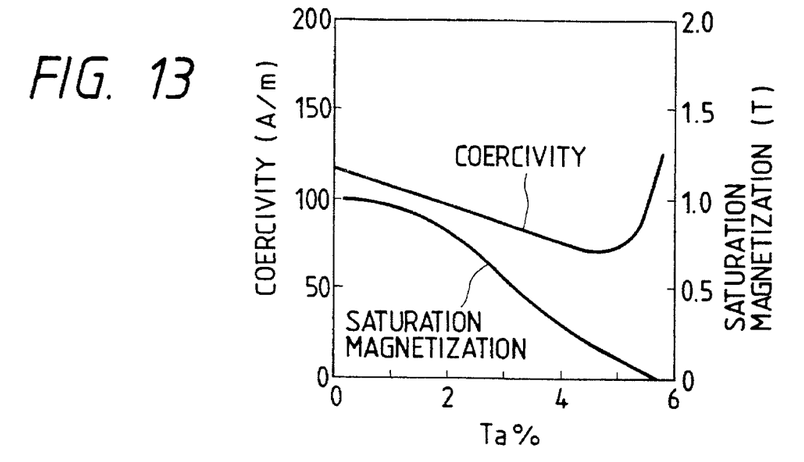
FIG. 13 is a graphic representation of the effect of one embodiment of the present invention.
Figure 14:
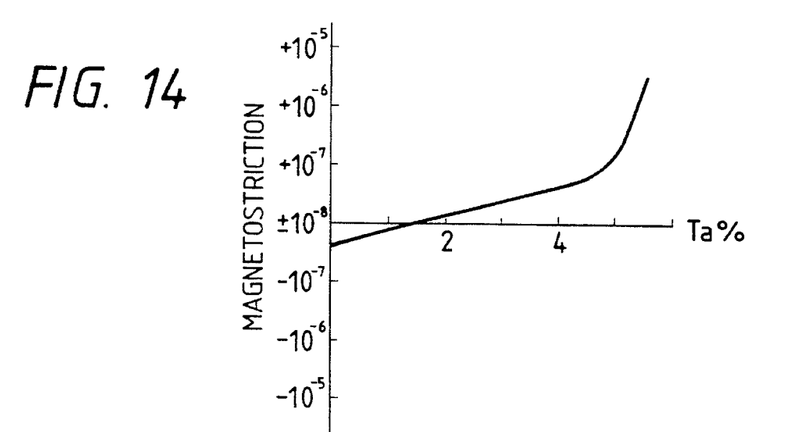
FIG. 14 is a graphic representation of the effect of one embodiment of the present invention.

% Fe alloy plate containing iron Fe of 19 at. %. The amounts of ruthenium Ru and tantalum Ta are adjusted by the number of Ra and Ta disks attached. This embodiment uses glass as the substrate. A NiFe—Ru—Ta alloy sputtered film is obtained by evacuating the vacuum tank of the sputtering device down to a vacuum of $10^{-4}$ Pa, supplying Ar gas into the vacuum tank to get a vacuum of $5 \times 10^{-1}$ Pa, and sputtering with a supply power of 200 watts. The obtained film is 5 nm to 100 nm thick. FIG. 13 and FIG. 14 represent how the magnetic and magnetoresistive characteristics of the NiFe-3 at. % Ru alloy sputtered film of 50 nm thick are affected by the quantity of added tantalum Ta. As shown in FIG. 13, little deterioration of saturation magnetization of the NiFe alloy film is found when tantalum Ta of up to about 2 at. % is added. However, saturation magnetization of this alloy film steeply goes down as the quantity of added tantalum Ta increases over 3 at. %. The coercivity gradually goes down as the quantity of added Ta increases up to 5 at. %, but goes up as the quantity exceeds 5 at. %. The magnetostriction varies gradually towards the positive area in the figureas the quantity of added Ta increases up to 4 at. % to 5 at. % and greatly varies towards the positive section when the quantity of tantalum exceeds 5 at. % of in case the magnetostriction of the NiFe-6at. % Ru alloy film is $-3.3 \times 10^{-7}$. The magnetoresistivity of the alloy film drastically goes down as the quantity of added tantalum increases and falls under one twentieth of that of the NiFe alloy film at about 2 at. % of Tantalum. The specific resistance of the alloy film drastically increases as the quantity of added tantalum Ta increases up to 2 at. % but will be saturated for greater quantity of tantalum (about 3.5 times that of the NiFe alloy films). In short, the base characteristics of the NiFe—Ru—Fe alloy film are stable for 1 at. % to 5 at. % of added tantalum and the addition of tantalumm makes the specific resistance increase and the magnetoresistivity decrease strikingly. Therefore the obtained NiFe—Ru—Ta film has characteristics available enough to soft magnetic bias films of the said magnetoresistive element. Furthermore, the characteristics dispersion of the obtained films is very little. Then another NiFe—Ru alloy film having a different Ni—Fe composition is prepared to examine whether the characteristics of the NiFe—Ru alloy films are affected by Ni—Fe compositions. In the range of 79 at. % to 91 at. % of nickel Ni in the NiFe alloy, the characteristics are very stable and the magnetostriction is very low. An alloy film prepared by adding 2 at. % to 13 at. % of Ru and 1 at. % to 5 at. % of Ta to NiFe base alloy containing 79 at. % to 81 at. % of Ni has characteristics which are satisfactory enough as a soft magnetic bias film for the said magnetoresistive element.

[Embodiment 3]

Same as embodiment 2 except that Nb is used in place of Ta An alloy film prepared by adding 2 at. % to 13 at. % of Ru and 1 at. % to 5 at. % of Nb to NiFe base alloy containing 79 at. % to 81 at. % of Ni has characteristics which are satisfactory enough as a soft magnetic bias film for the said magnetoresistive element.

[Embodiment 4]

Same as embodiment 2 except that Ti is used in place of Ta An alloy film prepared by adding 2 at. % to 13 at. % of Ru and 1 at. % to 5 at. % of Ti to NiFe base alloy containing 79 at. % to 81 at. % of Ni has characteristics which are satisfactory enough as a soft magnetic bias film for the said magnetoresistive element.

[Embodiment 5]

Same as embodiment 2 except that V is used in place of Ta An alloy film prepared by adding 2 at. % to 13 at. % of Ru and 1 at. % to 5 at. % of V to NiFe base alloy containing 79 at. % to 81 at. % of Ni has characteristics which are satisfactory enough as a soft magnetic bias film for the said magnetoresistive element.

[Embodiment 6]

Same as embodiment 2 except that Zr is used in place of Ta An alloy film prepared by adding 2 at. % to 13 at. % of Ru and 1 at. % to 5 at. % of Zr to NiFe base alloy containing 79 at. % to 81 at. % of Ni has characteristics which are satisfactory enough as a soft magnetic bias film for the said magnetoresistive element.

[Embodiment 7]

Same as embodiment 2 except that Nb is used in place of Ta An alloy film prepared by adding 2 at. % to 13 at. % of Ru and 1 at. % to 5 at. % of Nb to NiFe base alloy containing 79 at. % to 81 at. % of Ni has characteristics which are satisfactory enough as a soft magnetic bias film for the said magnetoresistive element.

[Embodiment 8]

Figure 15:
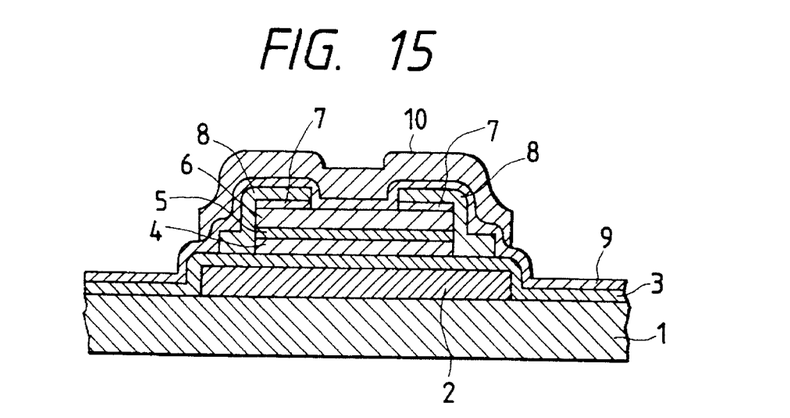
FIG. 15 is a cross sectional representation of the embodiment of the magnetoresistive head in accordance with the present invention.

A magnetoresistive head structured as shown in FIG. 15 was prepared using crystallized soft magnetic films described in Embodiment 1 to Embodiment 7. This process comprises depositing a Ni-19at. % Fe film of 1 μm thick on a non-magnetic insulation substrate 1 to form a magnetic shielding film 2 by sputtering, finely working it into a predetermined shape, depositing an aluminum oxide ($Al_2O_3$) film 3 of 0.2 μm on it to form an insulating film over it, depositing a (Ni-19 at. % Fe) –6 at. % Ru film 4 of 50 nm on it, depositing a Nb-10 at. % Ta alloy film of 10 nm thick (which has high specific resistance) on it, depositing a Ni-19 at. % Fe alloy film 6 of 50 nm thick (which is a magnetoresistive film) on it, finely working the product into a predetermined shape, depositing a Fe—Mn—Ru alloy film 7 which is a magnetic domain control film on each end of the product to form electrodes, depositing an aluminum oxide ($Al_2O_3$) film 9 of 0.2 μm on it to form an insulating film over it, depositing a Ni-19 at. % Fe film of 1 μm thick on the product to form a magnetic shielding film 29 on it by sputtering, further depositing an aluminum oxide ($Al_2O_3$) film of 2 μm on it, and forming it into a recording induction-type thin-film head.

Figure 16:
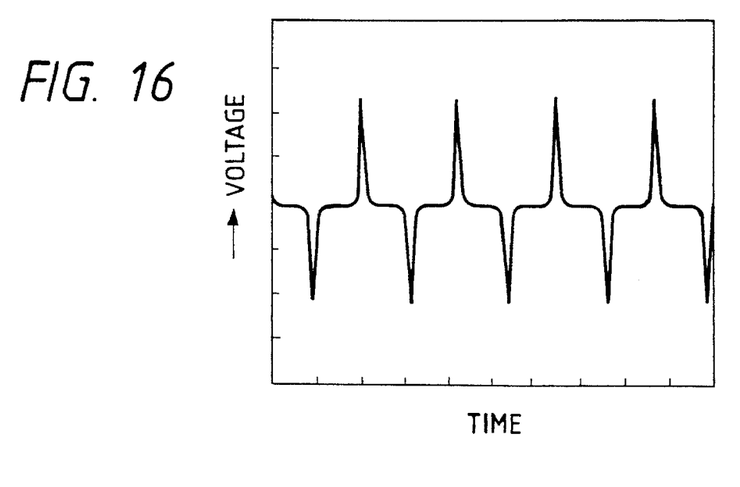
FIG. 16 is a graphic representation of the effect of one embodiment of the present invention.
Figure 17:
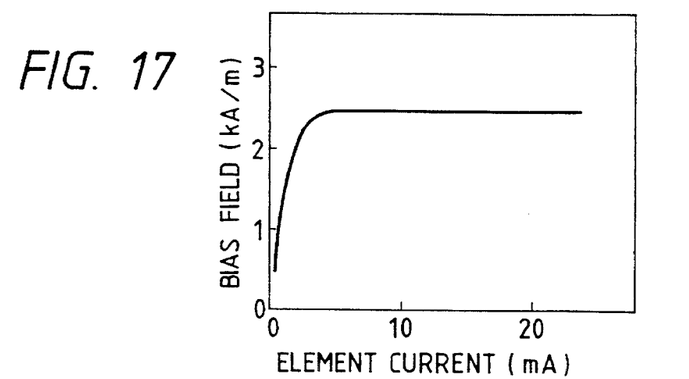
FIG. 17 is a graphic representation of the effect of one embodiment of the present invention.

As the result of measurement of recording and reproduction characteristics using this head and Co—Pt—Cr sputtering medium. This type of head generated reproduction output about eight times as strong as that of a shunt bias type magnetoresistive head using a Nb or Ti film as a bias film. FIG. 16 shows the waveform of a reproduction output of this embodiment of the magnetoresistive head in accordance with the present invention. FIG. 17 shows a curve respresenting the relationship between element current and bias field. As seen from this figure, an ample element current is applied even in the low element current range. As the magnetoresistive element of this invention can control to keep the electric resistance of each film constituting the element at a constant value, it can be driven by a constant voltage.

The same result was obtained from a magnetoresistive head having the same structure as that of Embodiment 8 except that it uses a NiO film as a magnetic domain control film.

The same result was obtained from a magnetoresistive head having the same structure as that of Embodiment 8 except that it uses a Fe—Ni—Mn alloy film as a magnetic domain control film.

[Embodiment 9]

A magnetoresistive head structured as shown in FIG. 15 was prepared using crystallized soft magnetic films described in Embodiment 1 to Embodiment 7. This process comprises depositing a Ni-19 at. % Fe film of 1 μm thick on a non-magnetic insulation substrate 1 to form a magnetic shielding film 2 by sputtering, finely working it into a predetermined shape, depositing an aluminum oxide ($Al_2O_3$) film 3 of 0.2 μm on it to form an insulating film over it, depositing a (Ni-19 at. % Fe) –6 at. % Ru film of 50 nm on it, depositing an aluminum oxide ($Al_2O_3$) film of 20 μm on it to form an insulating film over it, depositing a Ni-19 at. % Fe alloy film of 50 nm thick (which is a magnetoresistive film) on it, finely working the product into a predetermined shape, and performing the same remaining processes as those of Embodiment 8.

As the result of measurement of recording and reproduction characteristics using this head and Co—Pt—Cr sputtering medium. This type of head generated reproduction output about fifteen times as strong as that of a shunt bias type magnetoresistive head using a Nb or Ti film as a bias film. This difference in the magnitude of reproduction output is caused by a shunt current increased because the soft magnetic film is separated from the magnetoresistive film by an insulating film and consequentially the element current shunted to the soft magnetic film becomes zero.

[Embodiment 10]

The same result as those of Embodiment 8 and Embodiment 9 are obtained from a magnetic head made of a magnetoresistive element laminating a substrate, a NiFe magnetoresistive film, a spacer metallic film, and a soft magnetic bias film in that order.

[Embodiment 11]

In the case of a magnetoresistive head having the same structure as that of Embodiment 8, Embodiment 9, and Embodiment 10 except that it uses a Co/Cu superlattice film which is a giant magnetoresistive film as the magnetoresistive film, its reproduction output is about ten times as strong as that of the shunt bias type head using a Nb film as the shunt film.

[Embodiment 12]

In the case of a magnetoresistive head having the same structure as that of Embodiment 8, Embodiment 9, and Embodiment 10 except that it uses a NiFe/Cu superlattice film which is a giant magnetoresistive film as the magnetoresistive film, its reproduction output is about ten times as strong as that of the shunt bias type head using a Nb film as the shunt film.

[Embodiment 13]

In the case of a magnetoresistive head having the same structure as that of Embodiment 8, Embodiment 9, and Embodiment 10 except that it uses a NiFe/Cu/Co superlattice film which is a giant magnetoresistive film as the magnetoresistive film, its reproduction output is about ten times as strong as that of the shunt bias type head using a Nb film as the shunt film.

[Embodiment 14]

In the case of a magnetoresistive head having the same structure as that of Embodiment 8, Embodiment 9, and Embodiment 10 except that it uses a NiFe/Ag superlattice film which is a giant magnetoresistive film as the magnetoresistive film, its reproduction output is about ten times as strong as that of the shunt bias type head using a Nb film as the shunt film.

[Embodiment 15]

Figure 18:
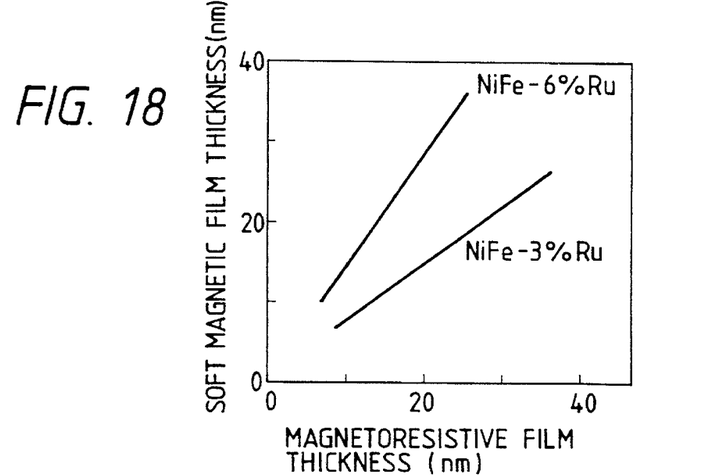
FIG. 18 is a graphic representation of the effect of one embodiment of the present invention.

In the case of a magnetoresistive head having the same structure as that of Embodiment 8, Embodiment 9, and Embodiment 10 except that the thickness of the magnetoresistive film is changed to 5 nm–80 nm and the thickness of the said soft magnetic film is changed to 2 nm to 90 nm to obtain an optimum bias, the similar result of measurement is obtained. The thickness of the magnetoresistive film should preferably be 5 nm to 60 nm. Outside this range, noises will increase. In this case, the thickness of the soft magnetic film must also be determined to obtain an optimum bias since the magnetic anisotropy of the magnetoresistive film is dependent upon the thickness. FIG. 18 shows examples of representing the relationship between the thickness of the magnetoresistive film and the thickness of the soft magnetic film to obtain optimum biases.

[Embodiment 16]

Figure 19:
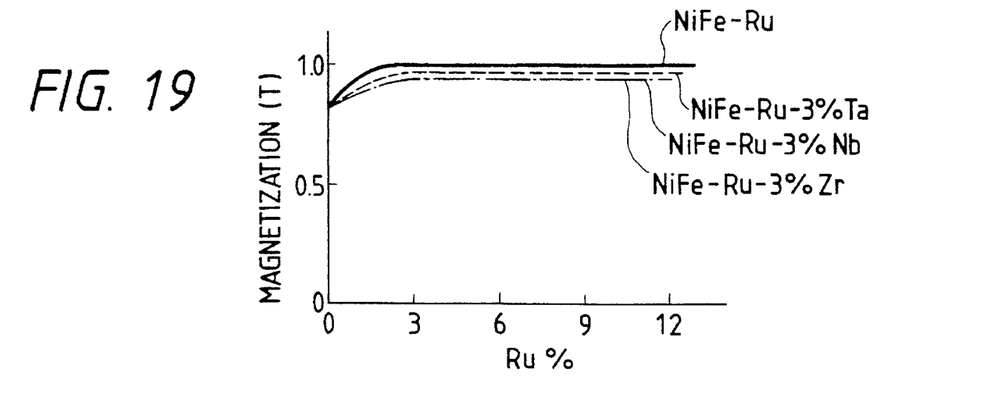
FIG. 19 is a graphic representation of the effect of one embodiment of the present invention.

To examine the corrosion resistance of soft magnetic films described in Embodiment 1 to Embodiment 7, the films are left in an environment of relative humidity of 90% and temperature of 80° C. for a preset time period and the changes of their magnetic characteristics are measured. FIG. 19 shows relationships between saturation magnetization and film component of typical soft magnetic film samples which were left 3000 hours in such a test environment. It is apparent that addition of Ru of 2 at. % to the Ni-19 at. % Fe film causes less reduction in saturation magnetization than that of the Ni-19 at. % Fe film itself and improves the corrosion resistance. A soft magnetic film to which Nb is added is a little inferior in corrosion resistance to a film to which Ru is added but superior to a Ni-19 at. % Fe film. In the actual use of a magnetic head, the cross sections of elements are exposed to the recording surface of medium. Accordingly, such heads are also left 3000 hours in the above test environment and tested. No output fluctuation and noise increase are detected in the reproduction output of the head.

[Embodiment 17]

A NiFe—Ta alloy target was prepared by attaching 8 mm-diameter tantalum disks onto a plate of Ni-19 at. % Fe alloy. The quantity of tantalum Ta attached to the alloy is adjusted by the number of Ta disks. This embodiment is employed to finely adjust the quantity of Ta to be added. The same result can be obtained using a NiFeTa alloy target. The glass substrate can be an aluminum insulating substrate or a metallic film.

The NiFe—Ta alloy sputtered film is obtained by evacuating the vacuum tank of the sputtering device down to a vacuum of $10^{-4}$ Pa, supplying Ar gas into the vacuum tank to get a vacuum of $5\times10^{-1}$ Pa, and sputtering with a supply power of 200 watts. The obtained film is 5 nm to 100 nm thick.

FIG. 6 represents the magnetic and magnetoresistive characteristics of the NiFe—Ta alloy sputtered film of 50 nm thick. No deterioration of saturation magnetization of the NiFe alloy film is found when tantalum Ta of up to about 6 at. % is added. However, saturation magnetization of the NiFe alloy film gradually goes down as the quantity of added tantalum increases over 6 at. % and it goes under 0.4 when the quantity exceeds 12 at. %, which is less than the lower limit value (0.4 T) available to the soft magnetic bias film. The coercivity, as shown in FIG. 7, comparatively increases as the quantity of added tantalum Ta exceeds 13 at. %. As shown in FIG. 8, the magnetostriction reduces steeply first and then gradually as the quantity of added tantalum increases. The sign of the magnetostriction changes from negative to positive at about 8 at. % of the quantity of added tantalum in case the magnetostriction of the NiFe alloy film is $-3.5\times10^{-7}$, but the amount of the change is very little. As the magnetostriction of under $-10^{-6}$ is substantially available to bias films, the above component range is available enough. As shown in FIG. 9, the magnetoresistivity of the alloy film steeply goes down as the quantity of added tantalum increases and falls under one tenth of that of the NiFe alloy film at about 2 at. % of tantalum. As shown in FIG. 10, the specific resistance of the alloy film drastically increases as the quantity of added tantalum increases up to 2 at. % but will be almost saturated for greater quantity of tantalum (about 4 to 5 times that of the NiFe alloy films). As explained above, the basic characteristics of the NiFe—Ta alloy films are very stable and satisfactory. Judging from the above characteristics, the preferable quantity of tantalum Ta to be added is 2 at. % to 9 at. %. This range of quantity of tantalum gives excellent bias film characteristics and the obtained films have a very little dispersion of characterics. Also in the range of 1 at. % to 12 at. % of added tantalum, the NiFe—Ta alloy film are fully available if the thickness of the soft bias element is adjusted.

Figure 20:
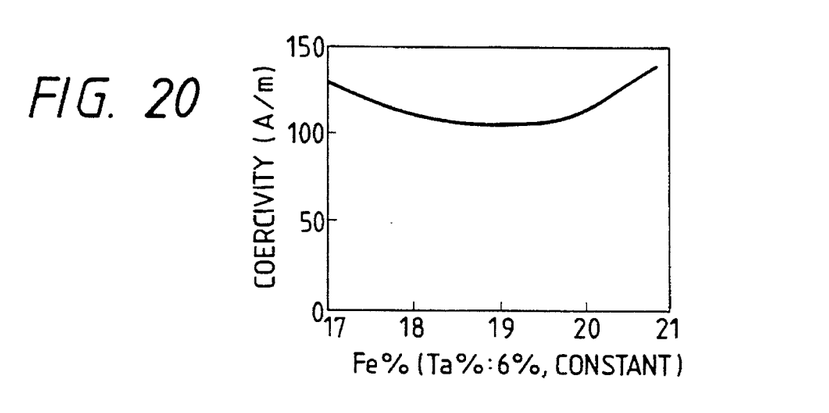
FIG. 20 is a representation of one embodiment of the present invention.
Figure 21:
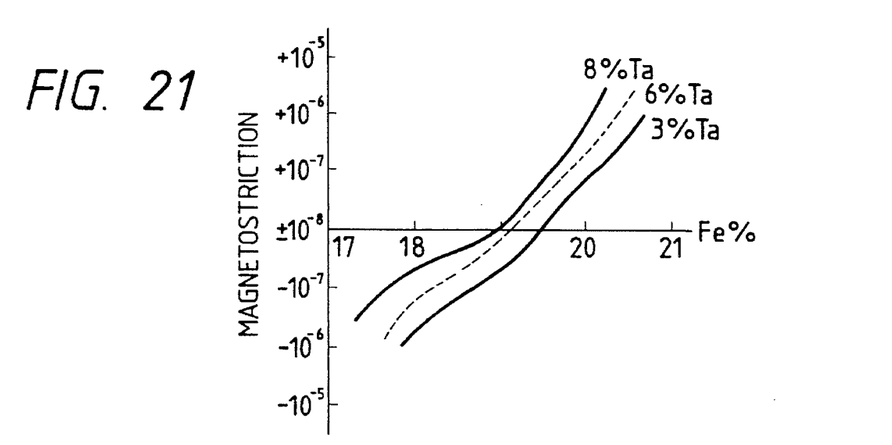
FIG. 21 is a representation of one embodiment of the present invention.

Then another NiFe—Ta alloy film having a different Ni—Fe composition is prepared to examine whether the characteristics of the NiFe—Ta alloy films are affected by Ni—Fe compositions. FIG. 20 shows a curve of representing the relationship between the coercivity (on the Y axis) and the Ni—Fe composition (on the X axis) (where the quantity of added tantalum is constant). As seen from this figure, the coercivity is low and makes little change in the range of 79 at. % to 91 at. % of the ratio of Ni in the Ni—Fe alloy. Outside this range, the coercivity is high. Accordingly the preferable composition of the NiFe base alloy is in the range of 80:20 to 82:18 (Ni:Fe in at. %). FIG. 21 shows curves of representing how the relationship between the magnetostriction (on the Y axis) and the Ni—Fe composition (on the X axis) varies according to the quantity of added tantalum. The magnetostriction like the coercivity is low (under $10^{-6}$) and makes little change in the range of 80 at. % to 82 at. % of the ratio of Ni in the Ni—Fe alloy. Outside this range, the magnetostriction is high. Therefore, also at the point of view of magnetostriction, the preferable composition of the NiFe base alloy is in the range of 80:20 to 82:18 (Ni:Fe in at. %).

The same result is obtained by using NiFe—Ta alloy of the predetermined composition.

[Embodiment 18]

A NiFe—Ta—Nb alloy target is prepared by attaching 8 mm-diameter tantalum and niobium disks onto a Ni-19 at. % Fe alloy plate containing iron Fe of 19 at. %. The amounts of tantalum Ta and niobum Nb are adjusted by the number of Ta and Nb disks attached. This embodiment uses glass as the substrate. A NiFe—Ta—Nb alloy sputtered film is obtained by evacuating the vacuum tank of the sputtering device down to a vacuum of $10^{-4}$ Pa supplying Ar gas into the vacuum tank to get a vacuum of $5\times10^{-1}$ Pa, and sputtering with a supply power of 200 watts. The obtained film is 5 nm to 100 nm thick.

Figure 22:
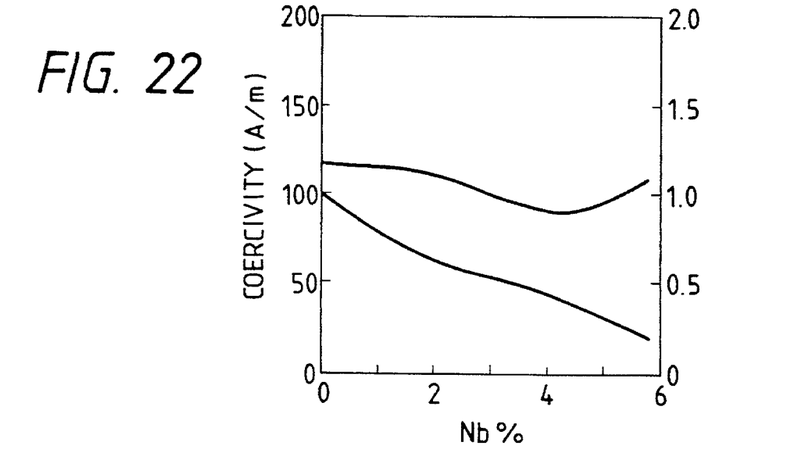
FIG. 22 is a representation of one embodiment of the present invention.
Figure 23:
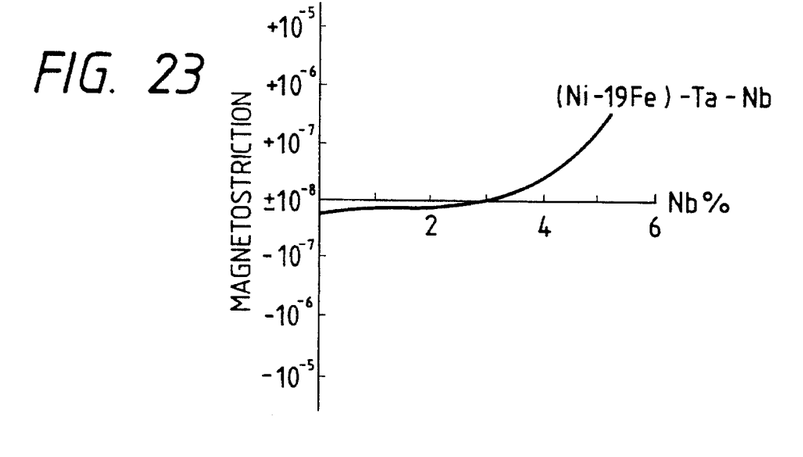
FIG. 23 is a representation of one embodiment of the present invention.

FIG. 22 and FIG. 23 represent how the magnetic and magnetoresistive characteristics of the NiFe-5 at. % Ta alloy sputtered film of 50 nm thick are affected by the quantity of added niobium Nb. Little deterioration of saturation magnetization of the NiFe alloy film is found when tantalum Ta of up to about 2 at. % is added. However, saturation magnetization of this alloy film steeply goes down as the quantity of added niobium Nb increases over 3 at. %. The coercivity gradually goes down as the quantity of added Nb increases up to 5 at. %, but goes up as the quantity exceeds 5 at. %. The magnetostriction varies gradually towards the positive area in the figure as the quantity of added Nb increases up to 2 at. % to 3 at. % and steeply varies towards the positive section when the quantity of niobium exceeds 3 at. % in case the magnetostriction of the NiFe-5 at. % Ta alloy film is $-3.3\times10^{-8}$. The magnetoresistivity of the alloy film steeply goes down as the quantity of added niobium increases and falls under one twentieth of that of the NiFe alloy film at about 0.5 at. % of niobium. The specific resistance of the alloy film drastically increases as the quantity of added tantalum Ta increases up to 2 at. % but will be saturated for greater quantity of tantalum (about 2.5 times that of the NiFe-5 at. % Ta alloy films). In short, the base characteristics of the NiFe—Ta—Nb alloy film are stable for 0.5 at. % to 5 at. % of added niobium and the addition of tantalumm makes the specific resistance increase and the magnetoresistivity decrease strikingly. Therefore the obtained NiFe—Ta—Nb film has characteristics available enough to soft magnetic bias films of the said magnetoresistive element. Furthermore, the characteristics dispersion of the obtained films is very little. Then another NiFe—Ta alloy film having a different Ni—Fe composition is prepared to examine whether the characteristics of the NiFe—Ta alloy films are affected by Ni—Fe compositions. In the range of 79 at. % to 91 at. % of nickel Ni in the NiFe alloy, the characteristics are very stable and the magnetostriction is very low. An alloy film prepared by adding 2 at. % to 9 at. % of Ta and 0.5 at. % to 5 at. % of Nb to NiFe base alloy containing 79 at. % to 81 at. % of Ni has characteristics which are satisfactory enough as a soft magnetic bias film for the said magnetoresistive element.

[Embodiment 19]

Same as embodiment 2 except that Ti is used in place of Nb, an alloy film prepared by adding 2 at. % to 9 at. % of Ru and 0.5 at. % to 5 at. % of Ti to NiFe base alloy containing 79 at. % to 81 at. % of Ni has characteristics which are satisfactory enough as a soft magnetic bias film for the said magnetoresistive element.

[Embodiment 20]

Same as embodiment 2 except that Ir is used in place of Nb, an alloy film prepared by adding 2 at. % to 9 at. % of Ta and 0.5 at. % to 5 at. % of Ir to NiFe base alloy containing 79 at. % to 81 at. % of Ni has characteristics which are satisfactory enough as a soft magnetic bias film for the said magnetoresistive element.

[Embodiment 21]

Same as embodiment 2 except that V is used in place of Nb, an alloy film prepared by adding 2 at. % to 9 at. % of Ta and 0.5 at. % to 5 at. % of V to NiFe base alloy containing 79 at. % to 81 at. % of Ni has characteristics which are satisfactory enough as a soft magnetic bias film for the said magnetoresistive element.

[Embodiment 22]

Same as embodiment 2 except that Zr is used in place of Nb, an alloy film prepared by adding 2 at. % to 9 at. % of Ta and 0.5 at. % to 5 at. % of Zr to NiFe base alloy containing 79 at. % to 81 at. % of Ni has characteristics which are satisfactory enough as a soft magnetic bias film for the said magnetoresistive element.

[Embodiment 23]

Same as embodiment 2 except that Ru is used in place of Nb, an alloy film prepared by adding 2 at. % to 8 at. % of Ta and 1 at. % to 5 at. % of Ru to NiFe base alloy containing 79 at. % to 81 at. % of Ni has characteristics which are satisfactory enough as a soft magnetic bias film for the said magnetoresistive element.

[Embodiment 24]

Figure 24:
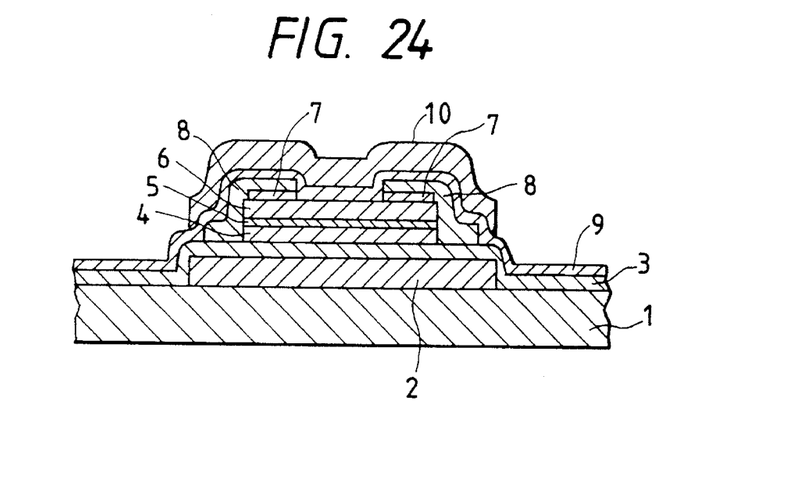
FIG. 24 is a cross sectional representation of the embodiment of the magnetoresistive head in accordance with the present invention.
Figure 25:
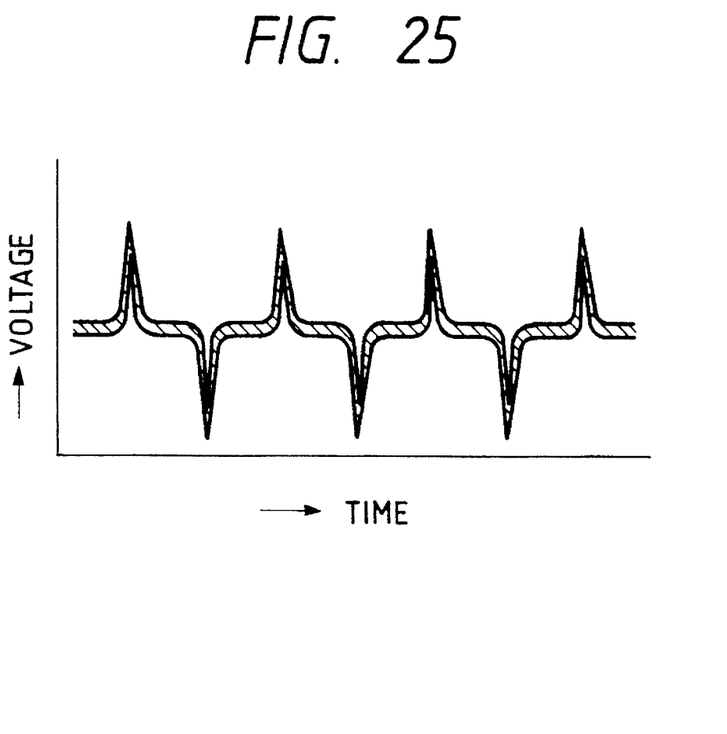
FIG. 25 is a representation of one embodiment of the present invention.
Figure 26:
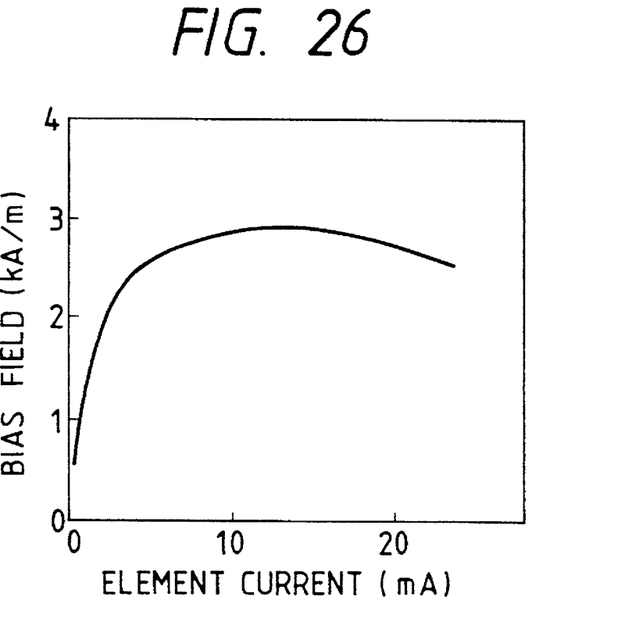
FIG. 26 is a representation of one embodiment of the present invention.

A magnetoresistive head structured as shown in FIG. 24 was prepared using crystallized soft magnetic films described in Embodiment 1 to Embodiment 7. This process comprises depositing a Ni—Fe film of 1 μm thick on a non-magnetic insulation substrate 1 to form a magnetic shielding film 2 by sputtering, finely working it into a predetermined shape, depositing an aluminum oxide ($Al_2O_3$) film 3 of 0.2 μm on it to form an insulating film over it, depositing a (Ni-19 at. % Fe) −5 at. % Ta film 4 of 50 nm on it, depositing a Nb-10 at. % Ta alloy film of 10 nm thick (which has high specific resistance) on it, depositing a Ni-19 at. % Fe alloy film 6 of 50 nm thick (which is a magnetoresistive film) on it, finely working the product into a predetermined shape, depositing a Fe—Mn—Ru alloy film 7 which is a magnetic domain control film on each end of the NiFe film 6 to form electrodes, depositing an aluminum oxide ($Al_2O_3$) film 9 of 0.2 μm on it to form an insulating film over it, depositing a Ni-19 at. % Fe film of 1 μm thick on the product to form a magnetic shielding film 10 on it by sputtering, further depositing an aluminum oxide ($Al_2O_3$) film of 2 μm on it, and forming it into a recording induction-type thin-film head. As the result of measurement of recording and reproduction characteristics using this head and Co—Pt—Cr sputtering medium, This type of head generated reproduction output about eight times as strong as that of a shunt bias type magnetoresistive head using a Nb or Ti film as a bias film. FIG. 25 shows the waveform of a reproduction output of this embodiment of the magnetoresistive head in accordance with the present invention. FIG. 26 shows a curve respresenting the relationship between element current and bias field. As seen from this figure, an ample element current is applied even in the low element current range. As the magnetoresistive element of this invention can control to keep the electric resistance of each film constituting the element at a constant value, it can be driven by a constant current.

[Embodiment 25]

A magnetoresistive head structured as shown in FIG. 24 was prepared using crystallized soft magnetic films described in Embodiment 1 to Embodiment 7. This process comprises depositing a Ni—Fe film of 1 μm thick on a non-magnetic insulation substrate 1 to form a magnetic shielding film 2 by sputtering, finely working it into a predetermined shape, depositing an aluminum oxide ($Al_2O_3$) film 3 of 0.2 μm on it to form an insulating film over it, depositing a (Ni-19 at. % Fe) −4 at. % Ru film of 50 nm on it, depositing an aluminum oxide ($Al_2O_3$) film of 20 μm on it to form an insulating film over it, depositing a Ni-19 at. % Fe alloy film of 50 nm thick (which is a magnetoresistive film) on it, finely working the product into a predetermined shape, and performing the same remaining processes as those of Embodiment 8.

As the result of measurement of recording and reproduction characteristics using this head and Co—Pt—Cr sputtering medium. This type of head generated reproduction output about ten times as strong as that of a shunt bias type magnetoresistive head using a Nb or Ti film as a bias film. This difference from Embodiment 8 in the magnitude of reproduction output is caused by a shunt current increased because the soft magnetic film is separated from the magnetoresistive film by an insulating film and consequentially the element current shunted to the soft magnetic film becomes zero.

[Embodiment 26]

The same result as those of Embodiment 8 and Embodiment 9 are obtained from a magnetic head made of a magnetoresistive element laminating a substrate, a NiFe magnetoresistive film, a spacer metallic film, and a soft magnetic bias film in that order.

[Embodiment 27]

In the case of a magnetoresistive head having the same structure as that of Embodiment 8, Embodiment 9, and Embodiment 10 except that it uses a Co/Cu superlattice film which is a giant magnetoresistive film as the magnetoresistive film, its reproduction output is about ten times as strong as that of the shunt bias type head using a Nb film as the shunt film.

[Embodiment 28]

In the case of a magnetoresistive head having the same structure as that of Embodiment 8, Embodiment 9, and Embodiment 10 except that it uses a NiFe/Cu superlattice film which is a giant magnetoresistive film as the magnetoresistive film, its reproduction output is about ten times as strong as that of the shunt bias type head using a Nb film as the shunt film.

[Embodiment 29]

In the case of a magnetoresistive head having the same structure as that of Embodiment 8, Embodiment 9, and Embodiment 10 except that it uses a NiFe/Cu/Co superlattice film which is a giant magnetoresistive film as the magnetoresistive film, its reproduction output is about ten times as strong as that of the shunt bias type head using a Nb film as the shunt film.

[Embodiment 30]

In the case of a magnetoresistive head having the same structure as that of Embodiment 8, Embodiment 9, and Embodiment 10 except that it uses a NiFe/Ag superlattice film which is a giant magnetoresistive film as the magnetoresistive film, its reproduction output is about ten times as strong as that of the shunt bias type head using a Nb film as the shunt film.

[Embodiment 31]

In the case of a magnetoresistive head having the same structure as that of Embodiment 8, Embodiment 9, and Embodiment 10 except that the thickness of the magnetoresistive film is changed to 5 nm–80 nm and the thickness of the said soft magnetic film is changed to 2 nm to 90 nm to obtain an optimum bias, the similar result of measurement is obtained. The thickness of the magnetoresistive film should preferably be 5 nm to 60 nm. Outside this range, noises will increase. In this case, the thickness of the soft magnetic film must also be determined to obtain an optimum bias since the magnetic anisotropy of the magnetoresistive film is dependent upon the thickness.

Figure 27:
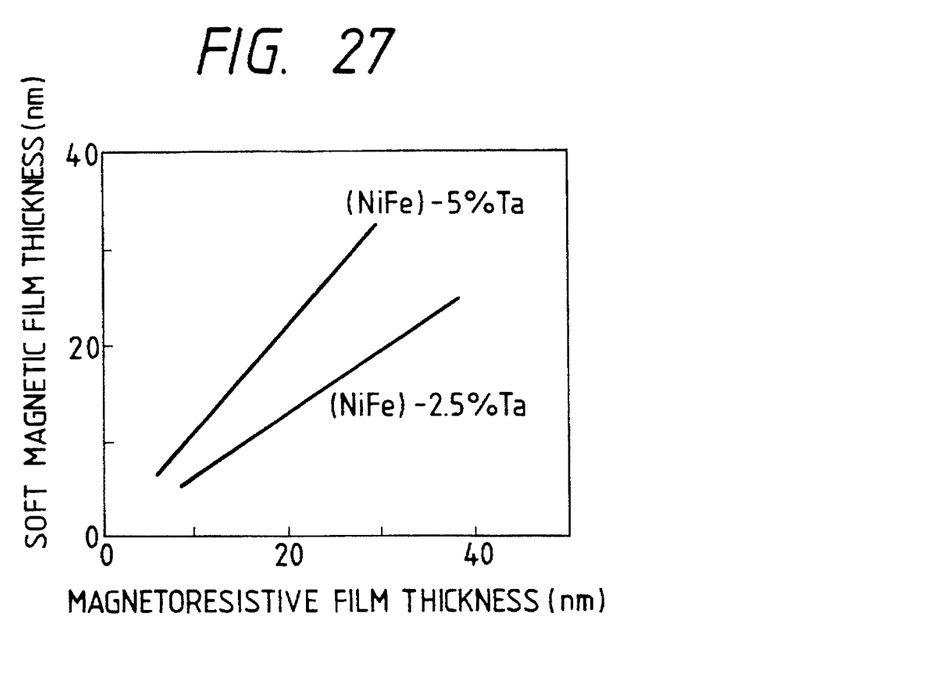
FIG. 27 is a representation of one embodiment of the present invention.

FIG. 27 shows examples of representing the relationship between the thickness of the magnetoresistive film and the thickness of the soft magnetic film to obtain optimum biases.

[Embodiment 32]

Figure 28:
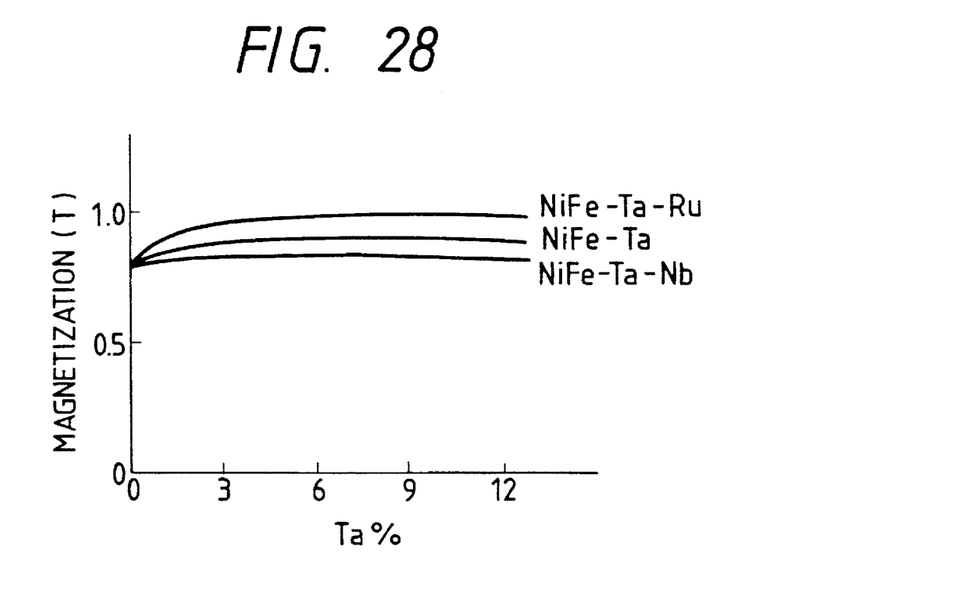
FIG. 28 is a representation of one embodiment of the present invention.

To examine the corrosion resistance of soft magnetic films described in Embodiment 1 to Embodiment 7, the films are left in an environment of relative humidity of 90% and temperature of 80° C. for a preset time period and the changes of their magnetic characteristics are measured. FIG. 28 shows relationships between saturation magnetization and film component of typical soft magnetic film samples which were left 3000 hours in such a test environment. It is apparent that addition of Ta of 2 at. % to the Ni-19 at. % Fe film causes less reduction in saturation magnetization than that of the Ni-19 at. % Fe film itself and improves the corrision resistance. A soft magnetic film to which Nb and other elements are added as fourth elements is a little inferior in corrision resistance to a film to which only Ta is added but superior to a Ni-19 at. % Fe film. The corrosion resistance of the soft magnetic film is further improved when Ru, Rh, Ir, and Cr are added as fourth elements to the film. In the actual use of a magnetic head, the cross sections of elements are exposed to the recording surface of medium. Accordingly, such heads are also left 3000 hours in the above test environment and tested. No output fluctuation and noise increase are detected in the reproduction output of the head.

The present invention can offer high-performance and low-cost magnetoresistive heads by using (Ni—Fe)—Ru and (Ni—Fe)—Ru—M (M: fourth element) films or (Ni—Fe)—Ta and (Ni—Fe)—Ta—M (M: fourth element) films which features high magnetic performance, high corrosion resistance, and low production cost as soft magnetic films to apply bias megnetic fields.

What is claimed is:

1. A magnetoresistive head comprising a crystallized soft magnetic bias film, a magnetoresistive film and a spacer insulation film therebetween, wherein said crystallized soft magnetic bias film has an alloy composition containing inevitable impurity and expressed by $$(NiFe)_y Ru_x$$

wherein x is in the range of 2 to 13 at. % and x+y=100 at. %.

2. A magnetoresistive head according to claim 1, wherein a ratio of Ni:Fe in at. % is in the range of 80:20 to 82:18.

3. A magnetoresistive head according to claim 1, wherein said magnetoresistive film is a multi-layer film comprising at least a first layer containing at least one element selected from the group consisting of Ni, Co and Fe and at least a second layer containing at least one element selected from the group consisting of Au, Ag, Cu and Cr.

4. A magnetoresistive head according to claim 1, wherein said crystallized soft magnetic bias film has a thickness in a range of 10 to 70 nm.

5. A magnetic storage device comprising the magnetoresistive head of claim 1, driven with a constant voltage.

6. A magnetoresistive head comprising a crystallized soft magnetic bias film, a magnetoresistive film and a spacer insulation film therebetween, wherein said crystallized soft magnetic bias film has an alloy composition containing inevitable impurity and expressed by $$(NiFe)_y (Ru_{x_3} M_{x_4})_x$$

wherein M is at least one element selected from the group consisting of Ta, Nb, Ti, V, Zr and Hf, x+y=100 at. %, $x_3$ is in the range of 2 to 13 at. % and $x_4$ is in the range of 1 to 5 at. %, $x = x_3 + x_4$ and x is in the range of 3 to 18 at. %.

7. A magnetoresistive head according to claim 6, wherein a ratio of Ni:Fe in at. % is in the range of 80:20 to 82:18.

8. A magnetoresistive head according to claim 6, wherein said magnetoresistive film is a multi-layer film comprising at least a first layer containing at least one element selected from the group consisting of Ni, Co and Fe and at least a second layer containing at least one element selected from the group consisting of Au, Ag, Cu and Cr.

9. A magnetoresistive head according to claim 6, wherein said crystallized soft magnetic bias film has a thickness in a range of 10 to 70 nm.

10. A magnetic storage device comprising the magnetoresistive head of claim 6, driven with a constant voltage.

11. A magnetoresistive head comprising a crystallized soft magnetic bias film, a magnetoresistive film and a spacer insulation film therebetween, wherein said crystallized soft magnetic bias film has an alloy composition containing inevitable impurity and expressed by $$(NiFe)_y Ta_x$$

where x is in the range of 2 to 9 at. % and x+y×100 at. %.

12. A magnetoresistive head according to claim 11, wherein a ratio of Ni:Fe in at. % is in the range of 80:20 to 82:18.

13. A magnetoresistive head according to claim 11, wherein said magnetoresistive film is a multi-layer film comprising at least a first layer containing at least one element selected from the group consisting of Ni, Co and Fe and at least a second layer containing at least one element selected from the group consisting of Au, Ag, Cu and Cr.

14. A magnetoresistive head according to claim 11, wherein said crystallized soft magnetic bias film has a thickness in a range of 10 to 70 nm.

15. A magnetic storage device comprising the magnetoresistive head of claim 11, driven with a constant voltage.

16. A magnetoresistive head comprising a crystallized soft magnetic bias film, a magnetoresistive film and a spacer insulation film therebetween, wherein said crystallized soft magnetic bias film has an alloy composition containing inevitable impurity and expressed by $$(NiFe)_y (Ta_{x_3} M_{x_4})$$

wherein M is at least one element selected from the group consisting of Nb, Ti, V, Zr, Hf, Ru, Rh and Cr, x+y=100 at. %, $x_3$ is in the range of 2 to 9 at. % and $x_4$ is in the range of 0.5 to 5 at. %, $x = x_3 + x_4$, $x_3 > x_4$ and x is in the range of 2.5 to 14 at. %.

17. A magnetoresistive head according to claim 16, wherein a ratio of Ni:Fe in at. % is in the range of 80:20 to 82:18.

18. A magnetoresistive head according to claim 16, wherein said magnetoresistive film is a multi-layer film comprising at least a first layer containing at least one element selected from the group consisting of Ni, Co and Fe and at least a second layer containing at least one element selected from the group consisting of Au, Ag, Cu and Cr.

19. A magnetoresistive head according to claim 16, wherein said crystallized soft magnetic bias film has a thickness in a range of 10 to 70 nm.

20. A magnetic storage device comprising the magnetoresistive head of claim 16, driven with a constant voltage.

* * * * *